July 26, 1927.

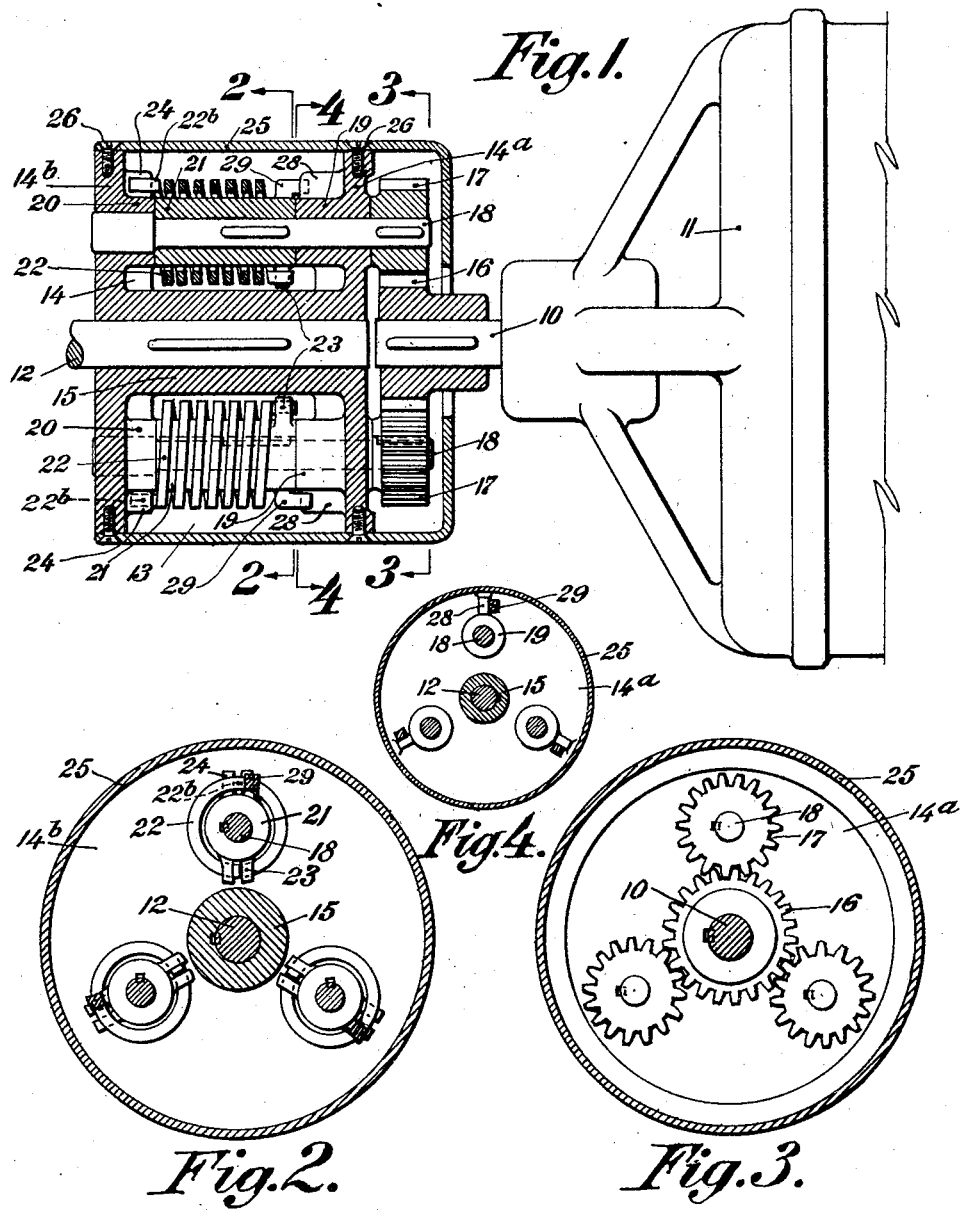

L. REISFELD 1,636,706

COUPLING

Filed April 9, 1924

2 Sheets-Sheet 2

Witness:
Marjorie Schmitz

Louis Reisfeld.
INVENTOR.
BY Rector, Hibben, Davis and Macauley
ATTORNEYS.

Patented July 26, 1927.

1,636,706

UNITED STATES PATENT OFFICE.

LOUIS REISFELD, OF CHICAGO, ILLINOIS.

COUPLING.

Application filed April 9, 1924. Serial No. 705,185.

This invention relates to improvements in couplings and its purpose is to provide a yielding coupling adapted to permit a limited relative movement between the connected shafts or other members when the initial movement of one of these members occurs. It is difficult to secure an exact alignment of two shafts which are connected together and one object of the present invention is to provide a coupling which will automatically compensate for any slight lack of alignment of the shafts which are connected by the coupling. A further advantage of the invention is that the yielding connection provided by the coupling serves to store up energy from the driving shaft which is utilized in overcoming the inertia of the driven shaft and in absorbing the shocks incident to the starting of the mechanism operated by the driven shaft. This feature is of advantage particularly where the driven shaft is connected to drive a considerable load and a motor is employed for operating the driving shaft. In that case the present invention permits the use of a motor having a relatively small starting torque since the energy of the motor is stored up in the resilient members of the coupling until the stored energy is sufficient to overcome the inertia of the driven shaft and its load. The various objects and advantages of the invention will appear more fully hereinafter.

Figure 5:
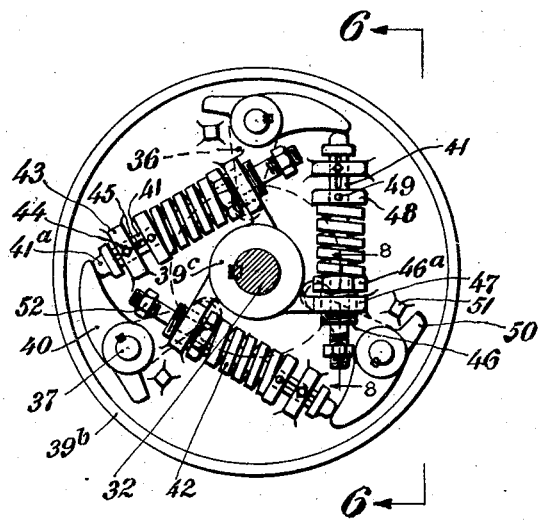
Figure 7:
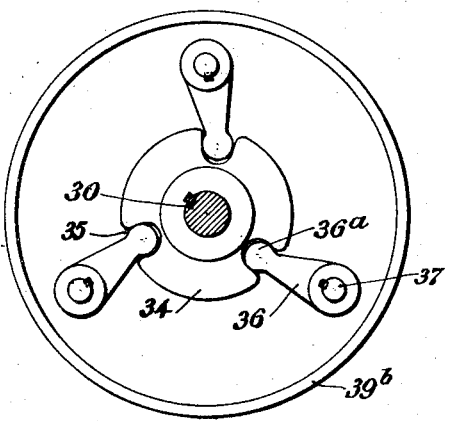
Figure 6:
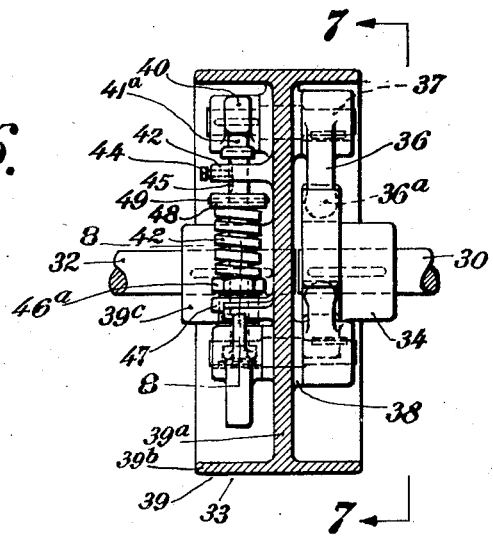
Figure 8:
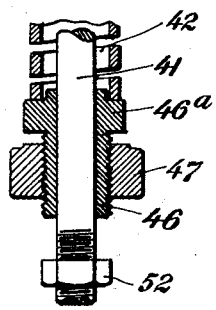

Two forms of the invention are described in the following specification taken in connection with the accompanying drawings in which Figure 1 shows a longitudinal section through the improved coupling; Fig. 2 shows a sectional view on the line 2—2 of Fig. 1; Fig. 3 shows a sectional view on the line 3—3 of Fig. 1; Fig. 4 is a sectional view taken on the line 4—4 of Fig. 1; Fig. 5 shows an end elevation of a modified form of the invention; Fig. 6 shows a transverse sectional view on the line 6—6 of Fig. 5; Fig. 7 is a sectional view taken on the line 7—7 of Fig. 6 showing an end elevation of the side of the apparatus opposite that illustrated in Fig. 5; and Fig. 8 is a detail sectional view taken on the line 8—8 of Fig. 6, showing the means of adjusting the operation of the springs.

In the drawings the driving shaft 10 is illustrated as the shaft of an electric motor 11 and this shaft is connected to the driven shaft 12 by means of the improved coupling 13. The coupling comprises a housing 14 having a hub 15 which is keyed on the shaft 12 and which supports the radial disks or end walls 14$^a$ and 14$^b$. A driving pinion 16 is keyed on the shaft 10 and this pinion meshes with three planetary gears 17 each of which is mounted on a small shaft 18. The shafts 18 are journaled in bearings 19 and 20 which are formed in the end walls 14$^a$ and 14$^b$, respectively, and each shaft 18 has keyed thereon between the bearings 19 and 20 a drum or sleeve 21 which is adapted to wind up a coil spring 22 when the connected shaft 18 is rotated in the proper direction. Each of the coil springs 22 is mounted on one of the drums 21 and one end of the spring is engaged by a radial lug or arm 23 which projects outwardly from the drum so that when the drum is rotated the end of the spring is carried around with it. The other end of each spring is held in a relatively stationary position with respect to the drum by the engagement of the extremity 22$^b$ thereof with an aperture in a boss 24 formed in the end wall 14$^b$. These parts of the coupling are enclosed by a cylinder 25 which forms the outer wall of the casing 14. This cylinder projects beyond the end wall 14$^a$ to form a housing for the planetary gearing and it is secured to the end walls by means of screws 26.

In the construction of the coupling it is not necessary that the teeth of the pinion 16 and of the gears 17 be designed to have a perfect rolling contact on each other when the relative motion thereof takes place. The spaces between the teeth of the gears are preferably of sufficient depth to compensate for any lack of exact alignment of the shafts 10 and 12 which are connected together by the coupling, thus overcoming the difficulty which is usually encountered when aligning shafts are connected by rigid couplings. Assuming that the shaft 12 and its load are stationary and that the motor 11 has just been started to operate the shaft 10, the initial rotation of the pinion 16 rotates the gears 17 and thereby operates the shafts 18 to effect the winding up of the springs 22. As the energy is stored up in these springs, the torque on the casing 14 which is transmitted thereto through the ends 22$^b$ of the springs finally reaches a magnitude sufficient to overcome the inertia of the shaft 12 and its load and these parts are then set in motion. When the shaft 12 and its load are rotating and the springs 22 have been wound up, the pinion 16 remains locked with and in a relatively stationary position with respect to the gears 17 which then serve merely to transmit the motion of the pinion to the casing 14 and the shaft 12. The shafts 10 and 12 then rotate in unison during the continued operation of the motor 11. When the motor 11 is stopped, the shaft 12 and its load will come to rest and the energy stored up in the springs 22 may then result in a reverse rotation of the shaft 10. A clutch may be employed to prevent reverse rotation of the armature shaft of the motor or this reverse rotation may be utilized to generate electric power and return it to the supply circuit. It will be apparent that this form of coupling serves not only to compensate for lack of alignment of the connected shafts but that it also overcomes the necessity of using a driving motor having a large starting torque.

In the form of the invention illustrated in Figs. 1 to 4 inclusive it may be desirable to provide means for establishing a rigid connection between the shafts 18 and the casing 14 after the springs 22 have been wound up to a predetermined degree, thereby relieving the tress upon the springs during the normal operation of the apparatus. For this purpose, the hubs 19 on the casing 14 may be provided with integral lugs 28, which are adapted to be engaged by longitudinally extending lugs 29 formed on the drums 21, so that after the springs 22 have been wound up sufficiently to overcome the inertia of the shaft 12 and its load, the lugs 29 will engage the lugs 28 and transmit the driving force through these lugs to the casing during continued operation of the mechanism. If desired, the lugs 28 may be adjustable in position on the hubs 19.

A modified form of the invention is illustrated in Figs. 5 to 8 inclusive. In this form the driving shaft 30, which may be the armature of the shaft of a motor, is adapted to operate the driven shaft 32 through an intermediate coupling 33. The driving shaft 30 has keyed thereon a driving member 34 which may be considered a special form of driving gear having three equally spaced recesses 35 formed in the outer periphery thereof to receive the extremities of three driven members 36 which are in the form of levers kyed on the auxiliary shafts 37. The shafts 37 are journaled in hubs 38 formed in the central web 39$^a$ of the casing 39 which is constructed substantially in the form of a fly wheel or pulley having an annular flange 39$^b$ of cylindrical form which extends laterally in both directions from the web 39$^a$ to form a housing for the mechanism of the coupling. The hub 39$^c$ of the casing 39 is keyed on the driven shaft 32 and the driving force which is imparted to the shafts 37 through the members 34 and 36 is adapted to operate through intermediate resilient mechanism to cause the rotation of the casing 39 and the shaft 32. The extremities 36$^a$ of the driven members 36 which engage the recesses 35 in the driving member 34 are substantially spherical in form and the walls of the recesses 35 are arranged to have a similar contour so that the co-acting surfaces will have a free rolling contact when the member 34 is rotated. To compensate for lack of alignment of the shafts 30 and 32, the recesses 35 are increased in depth sufficiently to permit some radial adjustment of the spherical extremities 36$^a$ with respect to the driving shaft 30.

The angular movement of the driving member 34 on the shaft 30 causes a corresponding angular movement of the driven members 36 and the shafts 37. These shafts 37 extend through the web 39$^a$ of the casing and their projecting extremities have keyed thereon the operating levers 40 which are adapted to engage the heads 41$^a$ of a series of plungers 41 having coil springs 42 mounted thereon. The ends of the plungers 41 adjacent the heads 41$^a$ are slidably mounted in bosses 43 which are formed on the web 39$^a$, the set screws 44 mounted in the bosses being adapted to engage grooves 45 in the plungers to prevent rotation thereof. The other ends of the plungers 41 are slidably mounted in sleeves 46 which threadedly engage other bosses 47, also formed on the web 39$^a$. The sleeves 46 are provided with flanges or heads 46$^a$ to be engaged by a wrench or the fingers of the operator for adjusting the positions of the sleeves in the bosses 47, and the coil springs 42, previously referred to, are mounted between the sleeves 46 and the collars 48 which are fixed on the plungers by means of pins 49. The springs 42 thus tend normally to force the extremities of the operating levers 40 outwardly away from the axis of the shaft 32. This movement may be limited by the engagement of the levers 40 with the annular flange 39$^b$ of the casing, but it is preferably limited by the provision of projecting arms 50 on the hubs of the levers 40, these arms being adapted to engage the lugs 51 which project outwardly from the web 39$^a$.

In this second embodiment of the invention, the springs 42 are adapted to store up energy during the movement of the operating levers 40 caused by the partial rotation of the shafts 37 and when this stored energy is sufficient to overcome the inertia of the shaft 32 and its load, the casing 39 begins to rotate and thereby drives the shaft upon which it is mounted. The initial compression of the springs 42 may be so adjusted that, after sufficient energy has been stored in the springs 42 to start the rotation of the casing 39 and the shaft 32, the heads 41$^a$ of the plungers will engage the fixed bosses 43, thus driving the casing 39 without transmitting the driving force through the springs. The necessary adjustment of the springs 42 to obtain this result may be brought about by regulating the positions of the sleeves 46 in the bosses 47. To permit the initial assembly of the operating levers 40 on the shaft 37, the plungers 41 may be drawn inwardly to compress the springs 42 by screwing up the nuts 52 which are provided on the projecting threaded ends of the plungers. After the operating members 40 have been placed on the shaft 37, the nuts 52 are unscrewed to permit the heads 41ª of the plungers to engage the ends of the levers and also to leave sufficient play for the operation of the plungers during the actuation of the driving mechanism. This construction in addition to absorbing shocks and compensating for lack of alignment, has the advantage that it is very compact in form and it is particularly adapted for use where the inertia of the driven shaft may be overcome with a comparatively limited relative angular movement of the driving shaft with respect to the driven shaft when the apparatus is first started in operation.

Although two forms of the invention have been shown and described by way of illustration, it will be understood that it may be constructed in various other embodiments without departing from the scope of the appended claims.

I claim:

1. The combination in a coupling for connecting aligning shafts, of mechanism carried entirely by said shafts and controlled entirely by the rotation of said shafts for transmitting motion from one shaft to the other, said mechanism comprising intermeshing relatively movable gear members and the connected parts adapted to compensate for inaccuracies in the alignment of said shafts and to permit relative angular movement of said shafts for storing energy when one of said shafts is started in operation.

2. In combination, a pair of shafts located in substantial alignment, a member driven by one of said shafts and carried entirely by the other of said shafts, and energy storing mechanism having a continuous and permanent driving connection with said member and with said other shaft for transmitting motion between said shafts.

3. The combination in a shaft coupling of a pair of shafts in substantial alignment, a pinion driven by one of said shafts, and gear mechanism actuated by said pinion for transmitting motion to the other of said shafts, said gear mechanism being adapted to permit relative angular rotative movement of said shafts when said pinion is started in operation and to hold said shafts in aligning positions during the normal operation thereof.

4. The combination in a shaft coupling of a pair of shafts in substantial alignment, a driving member actuated by one of said shafts, a plurality of driven members actuated by and having continuous driving engagement with said driving member, and means connecting said driven members with the other of said shafts for storing up energy from said driven members and overcoming the inertia of said other shaft.

5. In combination, a pair of shafts in substantial alignment, a driving member actuated by one of said shafts, a plurality of rotatable driven members actuated by said driving member and each capable of a plurality of rotations with respect to the other of said shafts, said driving member and said driven members having cooperating means to compensate for lack of exact alignment of said shafts, and means actuated by the rotation of said driven members for transmitting motion from said driven members to the other of said shafts.

6. In combination, a pair of shafts in substantial alignment, a driving member actuated by one of said shafts, a plurality of driven members distributed around and radially outward from said driving member and actuated thereby, a plurality of resilient members each adapted to yield to the motion of a connected one of said driven members, and means for transmitting the energy of said resilient members to the other of said shafts to effect rotation thereof.

7. In combination, a pair of shafts in substantial alignment, a driving member actuated by one of said shafts, a plurality of driven members distributed around said driving member and actuated thereby for rotation on pivots having fixed positions with respect to the other of said shafts, a plurality of resilient members carried by said other shaft each adapted to yield to the motion of a connected one of said driven members, means for transmitting the energy of said resilient members to the other of said shafts to effect rotation thereof, and means for limiting the extent to which said resilient members may yield.

8. In combination, a pair of shafts in substantial alignment, a driving member actuated by one of said shafts, a plurality of driven members actuated by said driving member, a casing secured to the other of said shafts, and a plurality of resilient members supported by said casing independently of said driven members and each adapted to yield to the relative movement of a connected one of said driven members with respect to said casing.

9. The combination in a shaft coupling of a pair of shafts in substantial alignment, planetary gear mechanism actuated by one of said shafts, and energy storing means actuated by said gear mechanism for overcoming the inertia of the other of said shafts upon the initial operation of said gear mechanism.

10. The combination in a shaft coupling of a pair of shafts in substantial alignment, planetary gear mechanism actuated by one of said shafts, and energy storing means actuated by said gear mechanism for overcoming the inertia of the other of said shafts upon the initial operation of said gear mechanism, said gear mechanism being adapted to compensate for inaccuracy in the alignment of said shafts.

11. In combination, a pair of shafts located in substantial alignment, a rotatable driving member fixed on one of said shafts, a plurality of rotatable driven members meshing with said driving member and mounted on pivots having relatively fixed positions with respect to said other shaft, and a series of coiled springs carried by said other shaft and each connected with an individual one of said driven members to be wound up thereby when said driven members are actuated by said rotatable driving member.

12. The combination in a shaft coupling of a pair of shafts located in substantial alignment, a pinion fixed on one of said shafts, planetary gears actuated by said pinion, springs adapted to be wound up by the rotation of said gears, and means connecting said springs with the other of said shafts for effecting the rotation thereof.

13. In combination, a pair of shafts located in substantial alignment, a pinion fixed on one of said shafts, a casing fixed on the other of said shafts, a series of gears rotatively carried by said casing to mesh with said pinion, a series of drums each actuated by a selected one of said gears, and a coiled spring mounted on each of said drums, each of said coiled springs being connected at one end to the adjacent drum and at the other end to said casing.

14. In combination, a pair of shafts located in substantial alignment, a pinion fixed on one of said shafts, a casing fixed on the other of said shafts, a series of gears rotatively carried by said casing to mesh with said pinion, a series of drums each actuated by a selected one of said gears, a coiled spring mounted on each of said drums, each of said coiled springs being connected at one end to the adjacent drum and at the other end to said casing and means for limiting the movement of each of said drums with respect to said casing.

15. In combination, a pair of shafts in substantial alignment, a rotatable driving member fixed on one of said shafts, a casing fixed on the other of said shafts, a plurality of auxiliary shafts journaled in said casing, a plurality of driven members each fixed on one of said auxiliary shafts and arranged to mesh with said rotatable driving member, and resilient means actuated by the rotation of said auxiliary shafts for effecting the movement of said shaft on which said casing is fixed.

LOUIS REISFELD.